F. A. FOX.
ATTACHMENT FOR TIRE TREADS.
APPLICATION FILED SEPT. 9, 1908.
915,839.
Patented Mar. 23, 1909.
4 SHEETS—SHEET 1.
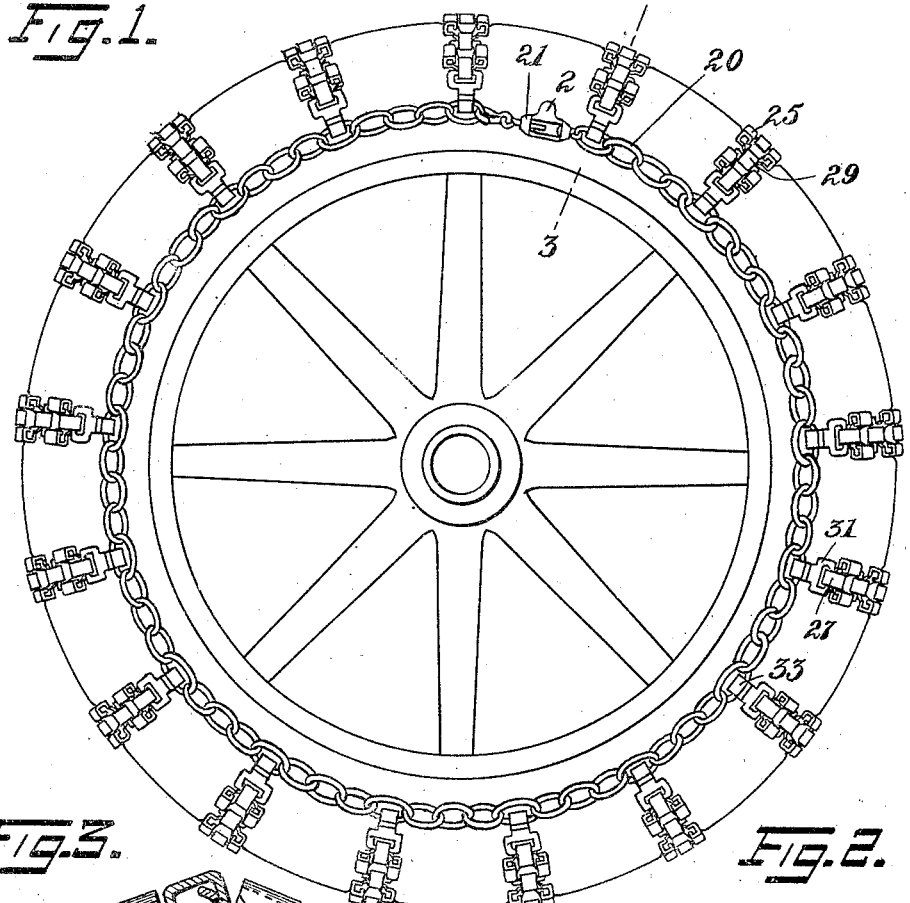
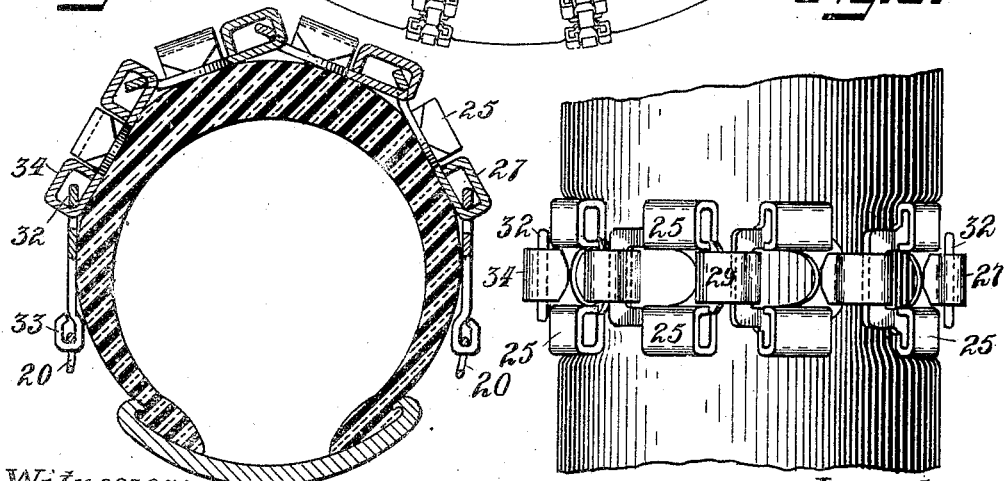
Witnesses:
H. D. Penney
A. B. Mattingly
Inventor:
Frank A. Fox,
By his Attorney, F. A. Richards, F. A. FOX.
ATTACHMENT FOR TIRE TREADS.
APPLICATION FILED SEPT. 9, 1908.
915,839.
Patented Mar. 23, 1909.
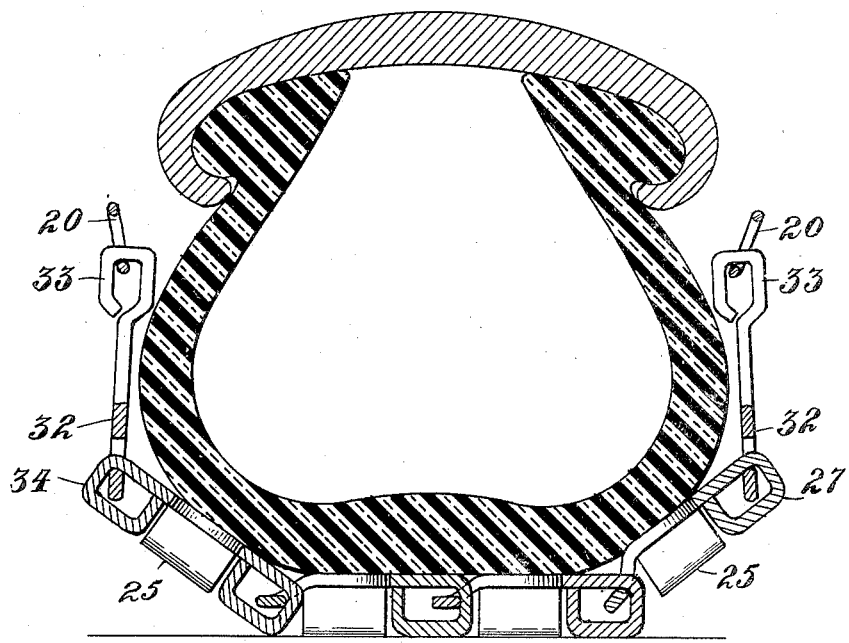
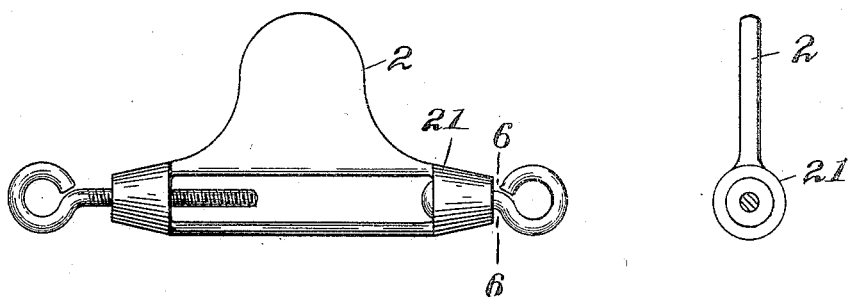
Witnesses:
Inventor:
Frank A. Fox.
By his Attorney,

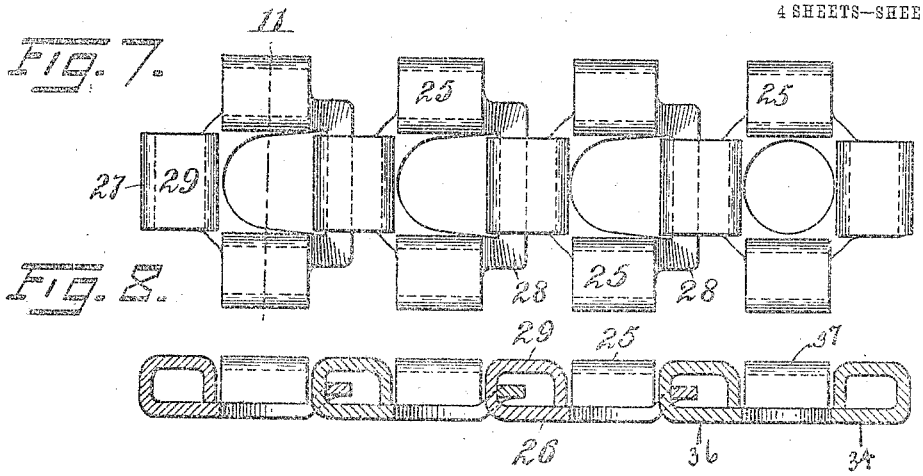
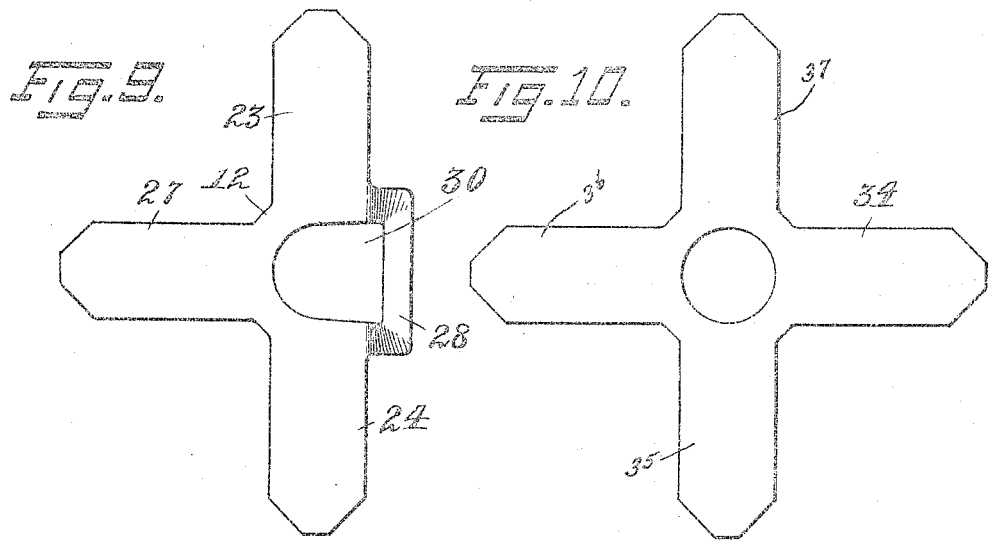
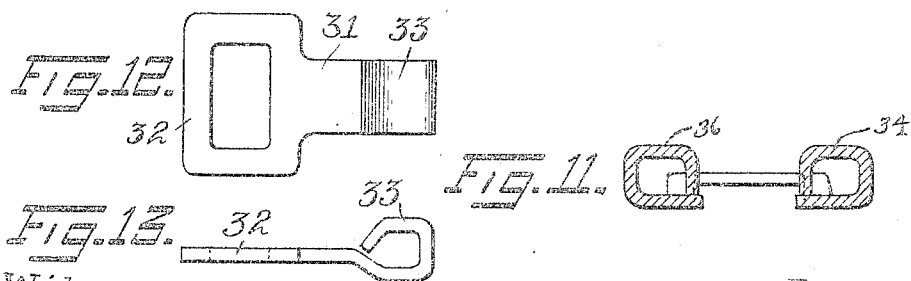

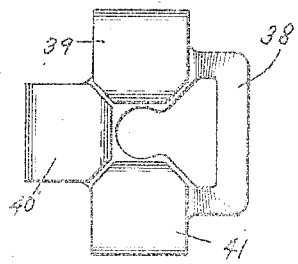
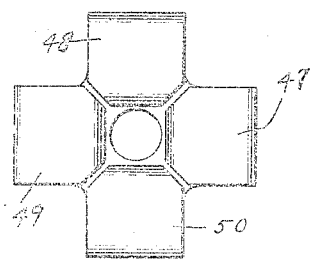
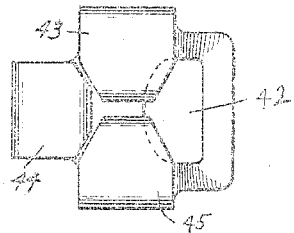
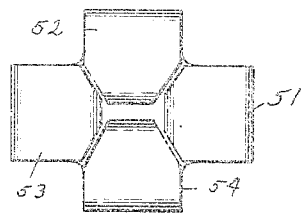
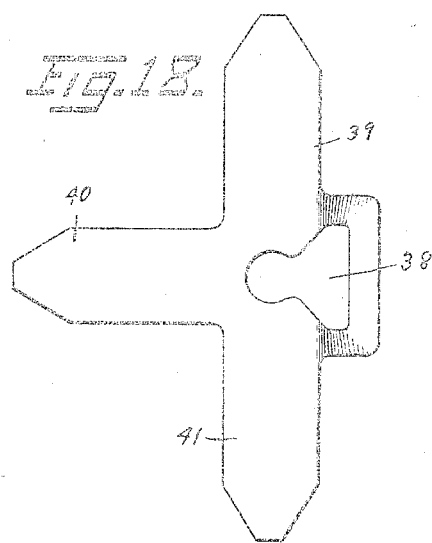
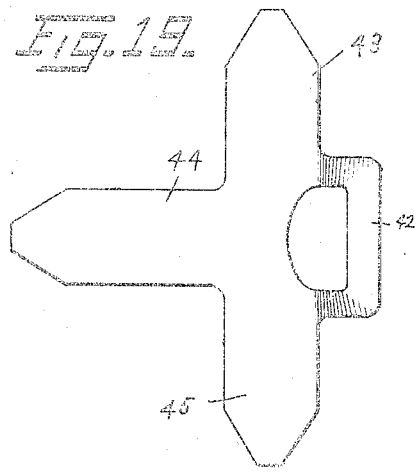

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

ATTACHMENT FOR TIRE-TREADS.

No. 915,839.　　　Specification of Letters Patent.　　Patented March 23, 1909.

Application filed September 9, 1908. Serial No. 452,205.

*To all whom it may concern:*

Be it known that I, FRANK A. FOX, a citizen of the United States, residing in New York city, in the county of New York and State of New York, have invented certain new and useful Improvements in Attachments for Tire-Treads, of which the following is a specification.

This invention relates to attachments for tires, especially to elastic tires of the pneumatic form; which attachments are for the purpose of preventing skidding or slippage of the tire on the road, both laterally and longitudinally of the vehicle; which attachment can be readily attached to and removed from the wheel, which will be of simple construction and comparatively light weight, yet which will have a comparatively large gripping surface for engagement with the road;
and which will have a comparatively smooth inner face for engagement with the tire that will not injure the same.

In the accompanying drawings illustrating embodiments of my invention, Figure 1 shows in side elevation a wheel with the tire attachment in place. Fig. 2 is a fragmentary view enlarged of the tire showing one of the cross members. Fig. 3 is a section on the line 3—3 indicated in Fig. 1. Fig. 4 is a transverse section through the tire and rim showing one of the cross members, with the tire depressed by engagement with the road. Fig. 5 is a side elevation of the turn buckle and Fig. 6 is a section on the line 6—6 of Fig.
5. Fig. 7 shows in plan and Fig. 8 in section one of the cross members. Fig. 9 shows in plan the blank for one of the links. Fig. 10 shows another form of blank. Fig. 11 is a transverse section on the line 11—11 of Fig.
7. Fig. 12 is a plan view and Fig. 13 a side view of one of the attaching links at the ends of the cross members and Figs. 14–19 show modified forms of links.

The tread attachment is shown as comprising two side members that may be of any flexible construction preferably some form of a chain, a simple link chain 20 is shown, and the meeting ends thereof are secured by any suitable attachment such for instance as a turn buckle 21 whereby the chain can be drawn taut. A pair of these chains 20 are used, one on each side of the tire and can be identical. At suitably spaced intervals are provided cross members whose ends are secured respectively to the side members or chains. These cross members preferably extend directly across the tread of the tire and may be equal distances apart. In the construction shown in Figs. 1–11, the cross members are shown as formed of a series of links that are suitably articulated. The links are provided with transversely extending loop portions that have substantial flat tread faces. The links further have preferably a substantial flat base and the flat tread faces on the opposite side lie substantially parallel with the base.

The links 22 are shown provided with loop portions formed by tongues 23 and 24 on opposite transverse sides that are bent over upon themselves to form a closed loop with the end of the tongue brought down to engage the base of the link; the three bends being substantially at a right angle to form somewhat of a rectangle in transverse section, as indicated in Fig. 11. By this arrangement it will be seen that a comparatively flat tread portion 25 is provided that is strongly supported at each end, which lies substantially parallel with the flat face 26 of the link. The links are suitably joined together, preferably by hook and eye portions in the respective links at their adjacent sides. The blank 12 is shown provided with a tongue 27 extending perpendicular to the opposite tongues 23 and 24, which tongue is bent to form a hook. On the opposite side of the blank is provided an eye portion 28 of a size to engage with the tongue 27 of an adjacent link on that side. The hook 27 is passed through the eye and then closed to form the hook and eye joint. Preferably this hook is formed similar to the loop portions at the sides, and is provided with a top tread face 29 lying in substantially the same plane as the tread faces 25 of the loops being also parallel with the base of the link. If desired the opening for the eye may extend to the center of the link forming an enlarged opening 30 that will reduce the weight of the link. A number of these links are thus articulated to form a cross member, as indicated in Figs. 1–4. The eye portion 28 is preferably bent upward from the base so that when the cross member is stretched taut the base portions of the links would lie in the same plane, and when the cross member is placed on the tire the base will lie practically flat on the tire as indicated in Figs. 3–4.

Suitable means are provided for securing the cross members to the chains or side members 20. In the construction shown connecting members 31 are provided having an eye portion 32 to engage the hook portion 27; while the other end has a hook portion 33 that can engage one of the links of the chain, and then the hook is closed. But for the other end of the cross members, the link preferable has the eye omitted, and has four hook portions 34, 35, 36 and 37, one of which engages the eye 28, while the opposite hook engages the eye 32 of the attaching member.

It will be observed from Fig. 4, that when the weight is placed on the tire to compress it, two of the links at the middle of the cross members will lie substantially parallel and engage the ground by the three tread faces of each link. But where the ground or road is comparatively soft, the tire will sink into the ground without flattening so much and more of the links will engage the ground. From this construction there will be comparatively sharp edges of the two transverse links to engage the ground and prevent skidding or lateral movement of the tire on the ground. And the lateral edges of the articulated hook portions will engage the ground to prevent slippage of the tire longitudinally. But the flat tread surfaces of the three members will effectually prevent slippage in both directions. It will also be noticed that the comparatively flat base of the links will not injure the tire and will not be forced into the tire as would result if a chain link or a round member were employed. Such a construction is of great economy in the manufacture as the cross members are formed of links all of which may be formed out of sheet metal by cutting and forming dies. The hook members can be partially closed and then the hook and eye portions joined, when the hooks can be entirely closed.

Means are provided on the turn buckle for preventing the nut unscrewing and becoming loose. The end members 21 is shown provided with a wing portion 2 extending laterally and which may be integral therewith. When the attachment is placed on the tire, the chain at this portion can be drawn sidewise a short distance to admit of the free turning of the nut until the proper tension is secured, then the chain is released and will be drawn tightly against the tire and the wing 2 will lie against the tire or the rim and prevent the turning of the nut member.

In the modification shown in Figs. 14–19, the shape of the tongue members is slightly changed. The end portions of the tongues are beveled whereby the hook and loop portions are brought near to the center of the link as shown in these views. In Figs. 14 and 18 are shown a link and its blank having an eye 38 and three hooks 39, 40 and 41, in which the hook ends are arranged in close proximity. Fig. 16 shows a similar link having an eye 42 and three hooks 43, 44 and 45; the blank for the link being shown in Fig. 19. Fig. 15 shows a link having four hook portions 47, 48, 49 and 50, with the adjacent ends of the links beveled similar to the link of Fig. 14, such link being used at the end of the chain as indicated in Fig. 8. A similar link is shown in Fig. 17, having four hooks, 51, 52 53 and 54.

Having thus described my invention, I claim:

1. A tread attachment for tires, comprising side members, cross members connected at their respective ends to the side members, each cross member formed of a series of links articulated together at their opposite ends, each link having an integral tread portion on each of its two lateral sides that is bent upward from the base and then across and then downward to engage the base of the link.

2. A tread attachment for tires, comprising side members, cross members connected at their respective ends to the side members, the cross members comprising a series of links having hook and eye portions at opposite sides by which the links are joined, the links having on each opposite lateral side between the hook and eye portions a tread portion formed by an integral strip bent upward from the base, and then extending across substantially parallel with the base with the extremity of the strip bent down to engage the base and support the tread portion, the top portion of the hook of the link being flat and lying in substantially the same plane as said tread portions.

3 In a device of the character described, a link member having an eye portion on one side, a hook portion on the opposite side with a substantially flat tread face, and provided with two looped portions located transverse to said hook and said eye portions having tread portions substantially flat and disposed in the same plane as the tread portion of said hook, the hook and loop portions having their end portions converging and arranged in close proximity.

FRANK A. FOX.

Witnesses:
WILLIAM H. REID,
H. D. PENNEY.